US006801890B1

(12) United States Patent
Kauschke et al.

(10) Patent No.: US 6,801,890 B1
(45) Date of Patent: Oct. 5, 2004

(54) METHOD FOR ENHANCING RECOGNITION PROBABILITY IN VOICE RECOGNITION SYSTEMS

(75) Inventors: Ulrich Kauschke, Iserlohn (DE); Herbert Roland Rast, Bonn (DE); Fred Runge, Wünsdorf (DE)

(73) Assignees: DeTeMobil, Deutsche Telekom MobilNet GmbH, Bonn (DE); Deutsche Telekom AG, Bonn (DE)

( * ) Notice: Subject to any disclaimer, the term of this patent is extended or adjusted under 35 U.S.C. 154(b) by 0 days.

(21) Appl. No.: 09/601,526
(22) PCT Filed: Jan. 20, 1999
(86) PCT No.: PCT/DE99/00137
 § 371 (c)(1),
 (2), (4) Date: Nov. 13, 2000
(87) PCT Pub. No.: WO99/40570
 PCT Pub. Date: Aug. 12, 1999

(30) Foreign Application Priority Data

Feb. 3, 1998 (DE) .......................................... 198 04 047

(51) Int. Cl.[7] .............................................. G10L 15/06
(52) U.S. Cl. ........................ 704/243; 704/256; 704/251; 704/231; 704/270
(58) Field of Search ................................ 704/243, 256, 704/251, 231, 235, 275, 270, 9, 246, 257, 260, 270.1

(56) References Cited

U.S. PATENT DOCUMENTS

| | | | | | |
|---|---|---|---|---|---|
| 4,489,434 | A | * | 12/1984 | Moshier | 704/239 |
| 4,489,435 | A | * | 12/1984 | Moshier | 704/244 |
| 4,672,668 | A | * | 6/1987 | Kitazume et al. | 704/245 |
| 5,040,213 | A | * | 8/1991 | Yasuda et al. | 704/244 |
| 5,329,609 | A | * | 7/1994 | Sanada et al. | 704/251 |
| 5,617,486 | A | * | 4/1997 | Chow et al. | 382/181 |
| 5,864,803 | A | * | 1/1999 | Nussbaum | 704/232 |
| 6,044,343 | A | * | 3/2000 | Cong et al. | 704/236 |
| 6,178,404 | B1 | * | 1/2001 | Hambleton et al. | 704/275 |
| 6,347,297 | B1 | * | 2/2002 | Asghar et al. | 704/243 |

\* cited by examiner

*Primary Examiner*—Vijay Chawan
(74) *Attorney, Agent, or Firm*—McCormick, Paulding & Huber LLP

(57) ABSTRACT

The invention relates to a method for enhancing recognition probability in voice recognition systems. According to the inventive method, selective post-training of the already stored homonymic term is carried out after inputting a term to be recognized. This makes it possible to improve the speaker-dependent recognition rate even in environments with prevailing acoustic interference.

6 Claims, 2 Drawing Sheets

METHOD FOR ENHANCING RECOGNITION PROBABILITY IN VOICE RECOGNITION SYSTEMS

CROSS-REFERENCE TO RELATED APPLICATIONS

This application is entitled to the benefit of and incorporates by reference in their entireties essential subject matter disclosed in International Application No. PCT/DE99/00137, filed on Jan. 20, 1999 and German Patent Application No. 19894047.4, filed on Feb. 3, 1998.

BACKGROUND OF THE INVENTION

The invention relates to a method for enhancing the recognition probability in voice recognition systems.

1. Field of the Invention
2. Description of the Related Art

U.S. Pat. No. 5,617,468 discloses a method for enhancing the recognition probability in voice recognition systems wherein, after input of a term to be recognized, a post-training of the previously stored homonymic term by means of the input term is carried out. This method does not permit reliable voice recognition in acoustically changing environments.

EP Patent No. 0 241 163 relates to a voice recognition method that alerts the user if a term to be recognized is already stored in a similar form in the voice recognition system and the two terms might be confused. This method also does not offer a reliable recognition of terms in changing acoustic environments.

BRIEF SUMMARY OF THE INVENTION

Voice recognition systems today are used primarily in computers, communication systems and other technical equipment where ease of operation or fast data input is important. The prior art systems, however, are not mature and are flawed in operation, particularly if they are operated in environments with acoustic interference. In this case, a word to be recognized is often misrecognized or not recognized at all. As a result, the user must multiply repeat the word to be recognized, which causes unreasonable delays if recognition errors occur frequently.

U.S. Pat. No. 5,617,468 discloses a method for enhancing the recognition probability in voice recognition systems wherein, after input of a term to be recognized, a post-training of the previously stored homonymic term by means of the input term is carried out. This method does not permit reliable voice recognition in acoustically changing environments.

EP-A-0 241 163 relates to a voice recognition method that alerts the user if a term to be recognized is already stored in a similar form in the voice recognition system and the two terms might be confused. This method also does not offer a reliable recognition of terms in changing acoustic environments.

Thus, the object of the present invention is further to develop to propose a method for voice recognition that enhances the speaker-dependent recognition rate in a user-friendly manner, particularly in environments with acoustic interference.

This object is attained by the characteristic features of claim 1.

Advantageous modifications and further developments of the invention are set forth in the dependent claims.

The invention proposes that in voice recognition systems a post-training of the voice patterns of newly input terms. rate, particularly in environments with acoustic interference, is enhanced.

The invention proposes that in voice recognition systems a post-training of the voice patterns of newly input terms, which may have been misrecognized or not recognized at all, be carried out. Post-training means that a misrecognized or non-recognized term is not simply overwritten after repeated input, but is compared and correlated with the previously input terms or supplemented by a new pattern in order to reduce or mask out patterns or incidental noise that are unimportant for recognizing the term. The invention is intended, in particular, for use in voice recognition systems that operate in environments with acoustic interference, e.g. in mobile radiocommunications terminals, telephones, etc.

If a term previously stored as a voice pattern is successfully recognized, the stored voice pattern is post-trained with the newly recorded pattern. In case of successful recognition of each previously recorded term, this post-training is carried out n times, where the number of passes can be freely selected and changed at any time. This post-training makes it possible continuously to reduce the influence of variable incidental noise on the actual constant voice pattern of a word.

According to a further development of the invention, if the recognition of a word is uncertain, the system prompts for a renewed input, which is used for post-training. Here, too, the maximum number of passes can be freely selected and changed at any time. If the comparison of an input voice pattern with stored voice patterns results in a similar and little differentiated recognition probability for several stored terms, the system plays these terms for the user and prompts the user to repeat the initially input term. If recognition is then successful, post-training is interrupted. For reasons of clarity, it is preferred to limit the number of the possible terms that are output by the system in case of uncertain recognition to a predefined number, and to limit the repetition of the process to, e.g. three direct repetitions.

Another further development provides that in case of a new input of a word or term in the system, the system carries out a comparison with previously stored terms after the new term has been input. The voice recognition system is thus used to compare a new term with previously stored terms and to determine whether the voice pattern of the new term is sufficiently distinct from the voice patterns of the previously stored terms that a misrecognition or uncertain recognition is not expected. However, if in the context of a correlation comparison based on a defined criterion of uncertain recognition, the new voice pattern results in a strong similarity or probable match with previously stored voice patterns, the system optically or acoustically informs the user and prompts him to repeat the input of the new term, which serves for post-training. The number of consecutive repetions can be freely selected and changed at any time.

BRIEF DESCRIPTION OF THE SEVERAL VIEWS OF THE DRAWINGS

The invention will now be described in greater detail by means of several drawing figures. The drawing figures and the pertaining description will illustrate additional features of the invention. The following show.

DETAILED DESCRIPTION OF THE INVENTION

Figure 1:
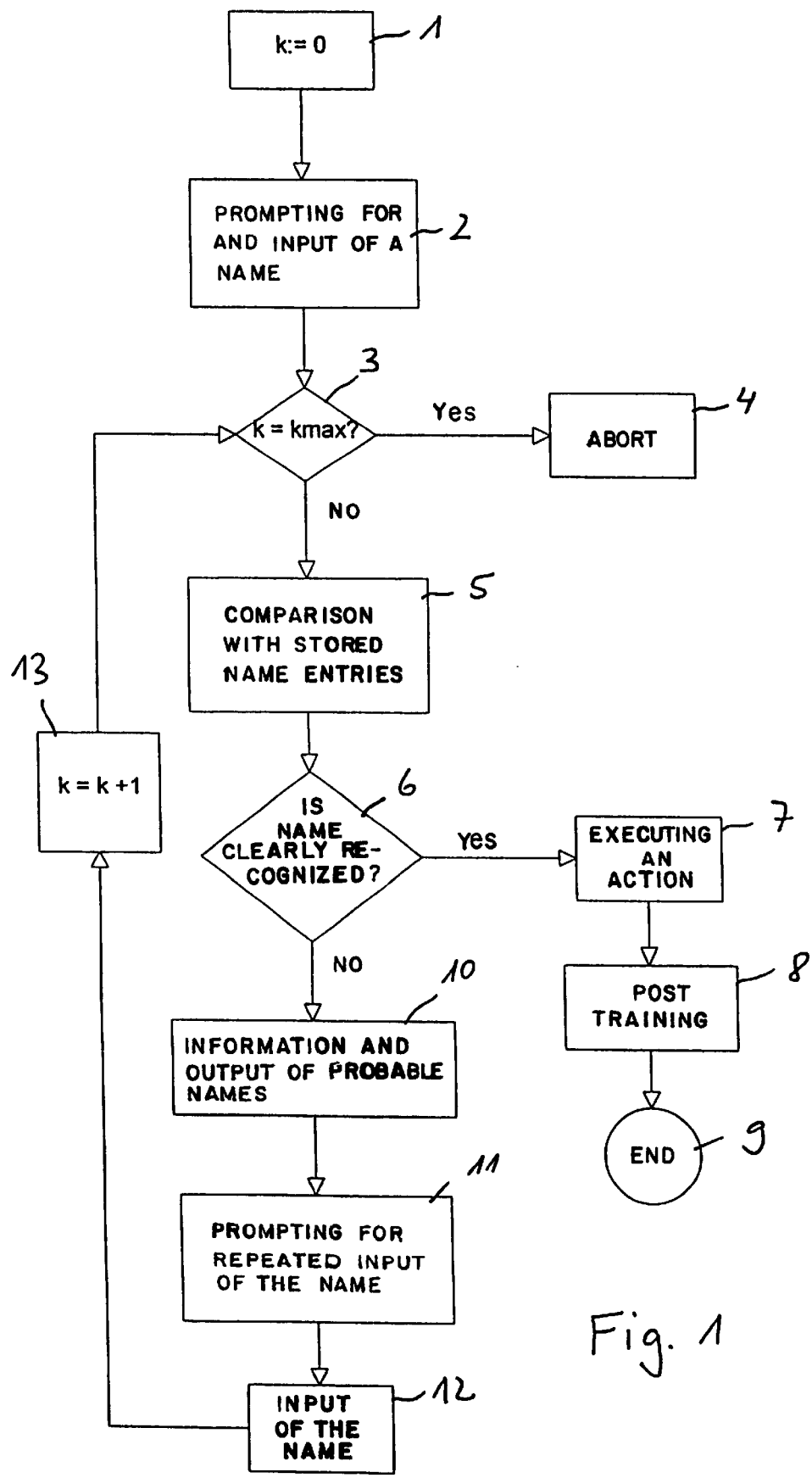
FIG. 1: a schematic flowchart of the method according to the invention based on the example of a voice recognition system used in a mobile telephone unit.

The inventive method will now be described in greater detail by means of the drawing figures in connection with a mobile telephone unit. A mobile telephone unit with voice recognition and voice output is assumed. The mobile telephone unit has a telephone directory with name entries, each of which is associated with a corresponding dial number. Through voice input of a name stored in the telepnone directory, the user can trigger a dial process or some other action.

According to FIG. 1, after successful recognition of a name previously stored as a voice pattern in the telephone directory, the stored voice pattern is post-trained with the newly recorded one. If the recognition of a name is uncertain, the system prompts for a renewed input, which is then used for post-training.

The variable $k$ or $k_{max}$ initally defined in Step 1 describes the number, or the maximum number, of training passes.

After prompting for and input of the name according to Step 2, a comparison is first made in Step 3 to determine whether the maximum number of post-training passes has been reached. If this is true, the operation is interrupted in Step 4. If the maximum number of passes has not been reached, the voice recognition system compares the name that has been input with the names previously stored in the telephone directory in Step 5. If the name that has been input is unambiguously recognized in Step 6, the action requested by the user is carried out in Step 7, e.g. a connection with the requested conversation partner is set up. Furthermore, in Step 8, a post-training of the corresponding telephone directory entry is carried out with the name that was last input and recognized as correct. The action is terminated in Step 9.

If, however, the name that has been input is not unambiguously recognized, the comparison of an input voice pattern with stored voice patterns in Step 6 results in a similar and little differentiated recognition probability for several stored names, the system informs the user and plays the name that is similar to the input name in Step 10. In Step 11 the user is prompted to repeat the initially input name in Step 12. The counter k is increased by one in Step 13, and the routine jumps back to step 3 and is repeated from this step.

Figure 2:
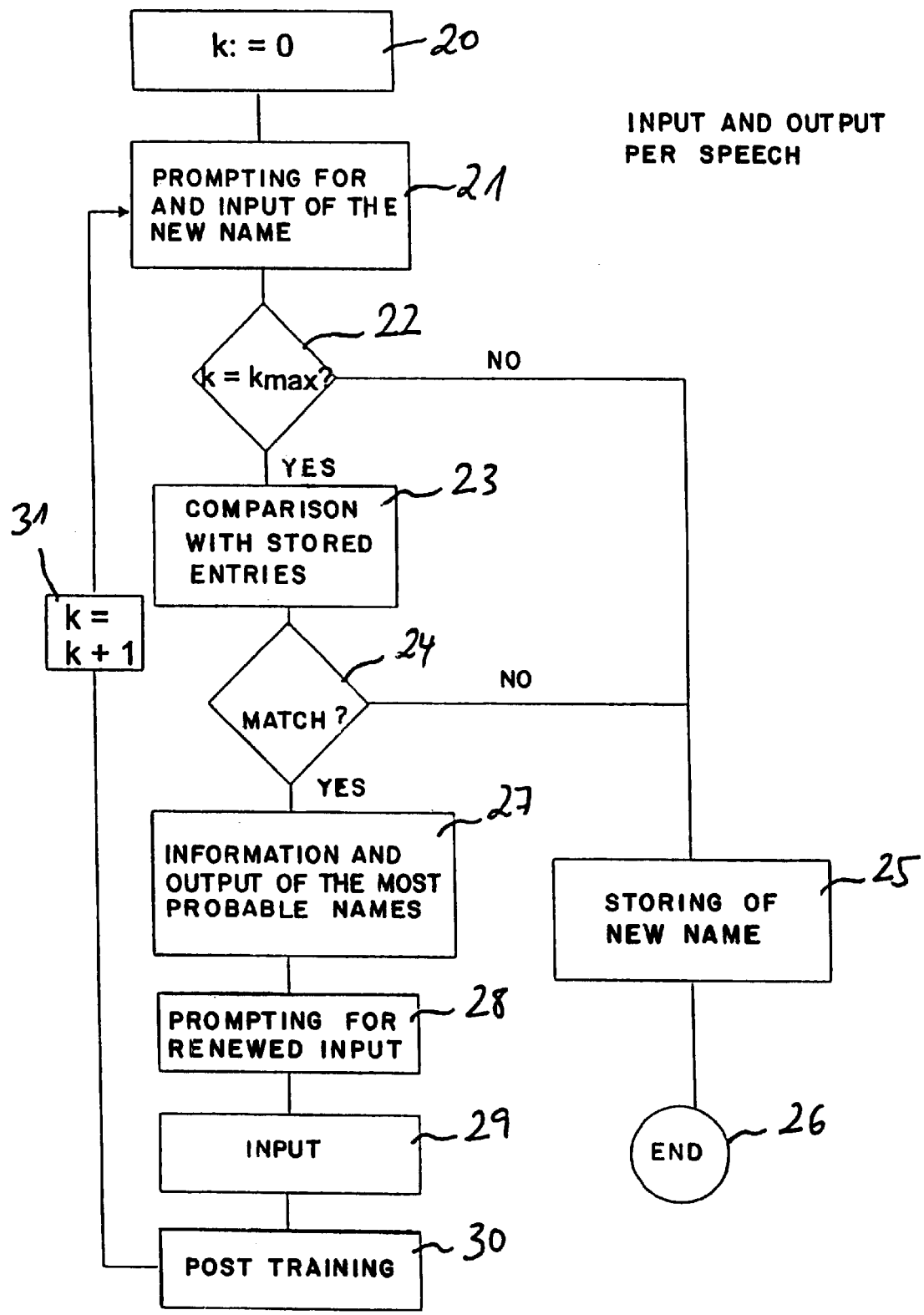
FIG. 2: a schematic flowchart of the method used in processing new inputs.

According to FIG. 2, if a name is newly entered in the telephone directory, a comparison with the previously stored names is carried out.

First the loop counter k is set to zero in Step 20.

The user is then prompted to input the new name in Step 21.

In Step 22 the system then checks whether the number of passes has exceeded the defined value. If this is true, the new name is stored in the telephone directory in Step 25 and the process is terminated in Step 26. If the counter is lower than the predefined value, the voice recognition system compares the new name with previously stored names in Step 23. If according to Step 24, the voice pattern is sufficiently distinct from the voice patterns of the previously stored names that a misrecognition or uncertain recognition is not expected, the new name is stored in the telephone directory in Step 25 and the process is terminated in Step 26. However, if within the context of a correlation comparison based on the defined criterion of uncertain recognition, the new voice pattern shows a strong similarity or probable match with previously stored names, the system optically or acoustically informs the user in Step 27 and prompts him to repeat the input of the new name in Step 28. The new name can be reinput in Step 29. The repeated input serves for post-training in Step 30. The number of consecutive repetions can be freely selected and changed at any time. After each pass, the counter is increased by one in Step 31, and the routine jumps back to Step 21.

What is claimed is:

1. Method for enhancing the recognition probability of voice recognition systems wherein, after input of a term to be recognized, a post-training of the previously stored homonymic term is carried out by means of the input term, characterized by:

a) input of the term to be recognized, b) comparison of the input term with terms previously stored in the voice recognition system, and c) if the term was unambiguously recognized:

1) execution of the desired action, 2) post-training of the corresponding stored term in the voice recognition system with the initially input term, and 3) termination of the process;

d) if the comparison results in an uncertain recognition probability for several stored terms:

1) information of the system user and display or playing of these terms which are similar to the input term, and 2) prompting of the system user to reinput the initially input term.

2. Method as claimed in claim 1, characterized in that the post-training is based on a comparison through correlation of the term that has been input with the previously stored homonymic term, wherein each of the characteristic voice patterns is determined and stored.

3. Method as claimed in claim 1, characterized in that the number of displayed/played terms is predefined.

4. Method as claimed in any one of claims 1–3, characterized in that, if a term is newly input into the voice recognition system, a comparison with the previously input terms is carried out after the new term has been input in order to determine whether the voice pattern of the new term is sufficiently distinct from the voice patterns of previously stored terms that no misrecognition or uncertain recognition is expected.

5. Method as claimed in any one of claims 1–3, characterized in that, if the new term, in the context of a correlation comparison based on a defined criterion, results in an uncertain recognition or a strong similarity or probable match with previously stored terms, the system optically or acoustically informs the user and prompts him to repeat the input of the new term, which serves for post-training.

6. Method as claimed in any one of claims 1–3, characterized in that the number of post-training passes is preselected.

* * * * *